United States Patent
Nguyen et al.

(10) Patent No.: US 12,182,733 B2
(45) Date of Patent: Dec. 31, 2024

(54) LABEL INFERENCE SYSTEM

(71) Applicant: Vinbrain Joint Stock Company, Ha Noi (VN)

(72) Inventors: Chanh DT. Nguyen, Ha Noi (VN); Hoang N. Nguyen, Ha Noi (VN); Thanh M. Huynh, Ha Noi (VN); Steven QH. Truong, Ha Noi (VN)

(73) Assignee: Vinbrain Joint Stock Company, Ha Noi (VN)

( * ) Notice: Subject to any disclaimer, the term of this patent is extended or adjusted under 35 U.S.C. 154(b) by 819 days.

(21) Appl. No.: 17/394,641

(22) Filed: Aug. 5, 2021

(65) Prior Publication Data
US 2022/0083878 A1  Mar. 17, 2022

(30) Foreign Application Priority Data

Sep. 15, 2020  (VN) .............................. 1-2020-05312

(51) Int. Cl.
*G06N 20/00* (2019.01)
*G06N 5/04* (2023.01)

(52) U.S. Cl.
CPC ............... *G06N 5/04* (2013.01); *G06N 20/00* (2019.01)

(58) Field of Classification Search
CPC .................................. G06N 5/04; G06N 20/00
USPC .......................................................... 706/12
See application file for complete search history.

(56) References Cited

U.S. PATENT DOCUMENTS 10,884,505 B1 * 1/2021 Huo ........................ G06F 3/012
2018/0336479 A1 * 11/2018 Guttmann ............ G06V 10/764

* cited by examiner

*Primary Examiner* — Austin Hicks
(74) *Attorney, Agent, or Firm* — United One Law Group LLC; Kongsik Kim; Jhongwoo Peck

(57) ABSTRACT

Provided is a label inference system including a data generator configured to generate a training set and a test set, each including a plurality of images labeled with experts' annotations, a data trainer configured to perform training for a base model based on the generated training set and test set, a determiner configured to identify whether an evaluation metric $f_1$ of the training model satisfies a base evaluation metric $f_1^{base}$, and a data inference unit configured to perform inference using the training set, the test set, and an unlabeled data set with the training model satisfying the base evaluation metric $f_1^{base}$.

13 Claims, 8 Drawing Sheets

FIG. 5

| Pseudo label method | Precision | Recall | AUC | F1 | F2 |
|---|---|---|---|---|---|
| No Pseudo label | 0.728994 | 0.718786 | 0.825933 | 0.723854 | 0.720805 |
| Pseudo label without distillation | 0.750903 | 0.728121 | 0.833815 | 0.739336 | 0.732566 |
| Pseudo label with distillation | 0.720088 | 0.765461 | 0.845472 | 0.742081 | 0.755935 |

FIG. 6

| Active Learning Method | Round 1 | | | Round 2 | | | Round 3 | | |
|---|---|---|---|---|---|---|---|---|---|
| | Labeled Data | | F1 | Labeled data | | F1 | Labeled data | | F1 |
| | Positive | total | | Positive | total | | Positive | total | |
| Baseline | 1,017 | 10,000 | 0.723834 | 1,044 | 10,000 | 0.73453 | 1,126 | 10,000 | 0.742081 |
| Naive Sample | 435 | 4,096 | 0.742081 | 376 | 3,118 | 0.740525 | 334 | 3,964 | 0.743119 |
| Boundary Sample | | | | | | 0.747836 | 385 | 2,118 | 0.740299 |
| Boundary Sample + Momentum | 921 | 3,928 | 0.744483 | 417 | 2,578 | 0.749713 | 342 | 1,780 | 0.75969 | a: Baseline b: Naive sampling c: Boundary sampling d: Boundary sampling a: Baseline b: Naive sampling c: Boundary sampling d: Boundary sampling

LABEL INFERENCE SYSTEM

CROSS-REFERENCE TO RELATED APPLICATION

This application claims priority to Vietnamese Application No. 1-2020-05312 filed on Sep. 15, 2020. The aforementioned application is incorporated herein by reference in its entirety.

TECHNICAL FIELD

Embodiments of the present invention relate to a label inference system that combines a novel active learning method, called Online Activate Learning (OAL), and a human in the loop, for efficient annotation.

RELATED ART

A chest X-ray (CXR) is one of the most popular and important imaging examination methods for screening, diagnosing, and managing public health. However, the clinical interpretation of a CXR requires the expertise of highly qualified radiologists.

Furthermore, some biases make the diagnosis even more problematic. Firstly, the geography bias where some diseases appear more frequently in some specific areas but are very rare in some others. Second, the expertise bias where radiologists are only good at diagnosing a specific set of diseases. Third, consistency among radiologists especially on ambiguous cases cause more noisy labelled data. The automated CXR interpretation system that assists radiologists in decision making would, therefore, tackle these problems.

Automated CXR interpretation software, at the level of an experienced radiologist, could provide a great benefit in both consistency and speed of diagnosis. However, it is challenging to develop such software that matches the expertise and experiences of practicing radiologists. Taking recent advantage of Artificial Intelligent (AI) and Deep Learning, many systems can outperform humans in terms of accuracy in a number of computer vision tasks. However, Deep Learning generally requires large-scale and high quality labeled datasets to achieve the human level of accuracy. These datasets are not easy to obtain in practice. Two main reasons are the expertise requirement to label the large amount of data and the consensus of doctors cannot be reached easily. Thus, the cost for high quality and large labeled data set is high and time consuming.

There are several methods to obtain a qualified label. In particular, three radiologists were selected at random for each image from a cohort of 11 American Board of Radiology-certified radiologists or from 13 individuals, including board-certified radiologists and radiology residents to label a test set or validation set, respectively. Adjudication proceeded until consensus, or up to a maximum of five rounds. This method produces high quality labels, but also consumes a lot of time and money. It is only well-suited for making the high-quality test and validation set.

There are several publicly available chest X-ray datasets that can be used for image classification and retrieval tasks. CheXpert is a large dataset of CXR and competition for automated chest X-ray interpretation. This dataset features uncertainty labels and radiologist-labeled reference standard evaluation sets. The 224,316 chest radiographs were collected from Stanford Hospital from 65,240 patients. The 14 observations was extracted based on the prevalence in the reports and clinical relevance using rule-based labelling tools. The evaluation of the dataset focuses on five observations which were used for the competition task: Atelectasis, Cardiomegaly, Consolidation, Edema, and Pleural Effusion.

Similar to CheXpert, MIMIC-CXR, as proposed in "Mimic-cxr, a de-identified publicly available database of chest radiographs with freetext reports." p. 317, 2019 by A. E. W. Johnson, T. J. Pollard, S. J. Berkowitz, N. R. Greenbaum, M. P. Lungren, C.-y. Deng, R. G. Mark, and S. Horng, contains 371,920 chest X-rays associated with 227,943 imaging studies sourced from the Beth Israel Deaconess Medical Center between 2011 and 2016. Each imaging study consists of one or more images, but most often is associated with two images: a frontal view and a lateral view. Images are provided with 14 labels derived from a natural language processing tool applied to the corresponding notes of radiology reports. Both MIMIC-CXR and CheXpert share a common labeling tool for extracting a set of labels from radiology reports.

Another large dataset, PAthology Detection in Chest radiographs (PadChest), includes more than 160,000 images obtained from 67,000 patients that were interpreted and reported by radiologists at Hospital San Juan in Spain from 2009 to 2017. The reports were labeled with 174 different radiographic findings, 19 differential diagnoses and 104 anatomic locations organized as a hierarchical taxonomy and mapped to standard Unified Medical Language System (UMLS) terminology. Of these reports, 27% were manually annotated by trained physicians and the remainder of the set was labeled using a supervised method based on a recurrent neural network with attention mechanisms.

Finally, the National Institute of Health of America (NIH) repository contains 108,948 frontal view chest X-rays (ChestX-ray8). It corresponds to 32,717 different patients and multi-labeled with 14 different thoracic diseases. Another publicly dataset available from NIH (ChestX-ray14) consists of 112,120 frontal chest radiograph images in 30,805 patients. ChestX-ray14 is enriched for various thoracic abnormalities relative to the general population.

From ChestX-ray14, the final labels for four findings (Pneumothorax, Airspace Opacity, Nodule or Mass and Fracture) of 2,412 validation images and 1,962 test images were assigned via adjudicated review by certified radiologists. Each image was first reviewed independently by three radiologists. If all radiologists agreed after the initial review, then that label became final. For images with label disagreements, images were returned for additional reviews. Anonymous labels and any notes from the previous rounds were also available during each iterative review. Adjudication proceeded until consensus, or up to a maximum of five rounds. For the small number of images for which consensus was not reached, the majority vote label was used.

Overall, these CXR datasets used as a ground-truth for training and validating the Machine Learning (ML) models are mostly used Natural Language Processing (NLP) techniques to automate their extraction. This technique has a limitation in dealing with multi-language ambiguity and the uncertainties in radiology reports. Furthermore, most of the annotations are not validated by radiologists or professional physicians to ensure the accuracy and quality of the annotations.

SUMMARY

The present invention is directed to providing a label inference system capable of improving label quality.

The present invention is also directed to providing a label inference system capable of saving costs.

One aspect of the present invention includes a label inference system including a data generator configured to generate a training set and a test set, each including a plurality of images labeled with experts' annotations, a data trainer configured to perform training for a base model based on the generated training set and test set, a determiner configured to identify whether an evaluation metric $f_1$ of the training model satisfies a base evaluation metric $f_1^{base}$ and a data inference unit configured to perform inference using the training set, the test set, and an unlabeled data set with the training model satisfying the base evaluation metric $f_1^{base}$.

The data generator may expand the training set by labeling and adding another batch of data into the training set when the determiner identifies that the evaluation metric $f_1$ of the training model is less than or equal to the base evaluation metric $f_1^{base}$.

The data trainer may perform training for the base model based on expanded training set and the test set.

When the determiner identifies that the evaluation metric $f_1$ of the training model is greater than the base evaluation metric $f_1^{base}$, the data inference unit may select an unlabeled data set from a data pool.

The data inference unit may calculate a current inference value of the unlabeled data set from a weighted average value of a previous inference value and a current estimated value.

The data inference unit may calculate the current inference value of the unlabeled data set according to Equation 1 below.

$$\hat{p}_t = F_\mu(\hat{p}_{t-1}, P_t),$$ [Equation 1]

wherein $\hat{p}_t$ represents an inference value, $\hat{p}_{t-1}$ represents a previous inference value, $p_t$ represents a current estimated value, $F_\mu$ represents an online update operator with momentum $\mu$, and t is a natural number.

The current inference values $\hat{p}_t$ may include samples with high confident score $\hat{p}_t^H$) and samples with low confident score $\hat{p}_t^L$.

The data inference unit may extract samples with thresholded high confidence scores $\hat{p}_t^{H,thresh}$ by hard-thresholding a subset of the samples with the high confidence scores $\hat{p}_t^H$ using a threshold $\tau_t$.

The data inference unit may extract samples with relabeled low confidence score $\hat{p}_t^{L,relabel}$, which is a subset of the samples with low confidence scores relabeled by an user.

The data inference unit may extract outliers of the training set and the test set, which need to be relabeled by an user, using the threshold $\tau_t$.

The data inference unit may perform inference using the updated training set and test set, which are modified by relabeling, and the updated unlabeled data set.

The data inference unit trains a new snapshot of the training model for some iterations t using the updated unlabeled data set, training set, and test set.

When the determiner identifies that the evaluation metric $f_1$ of the training model is greater than the target evaluation metric $f_1^{target}$, a terminal condition of the data inference unit is triggered.

The data inference unit may calculate the current inference value of the unlabeled data set using momentum.

The momentum is set to 0.5.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which:

FIGS. 5 to 8 are diagrams for explaining results of experiments conducted through a label inference system according to an embodiment.

DETAILED DESCRIPTION

Figure 1:
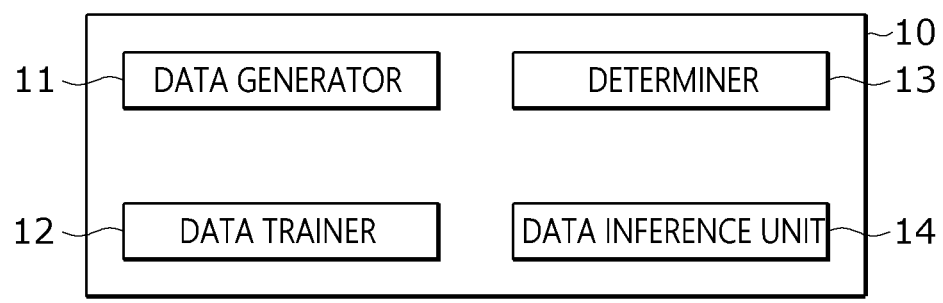
FIG. 1 is a configuration block diagram of a label inference system according to an embodiment.

Hereinafter, embodiments of the present invention will be described in detail with reference to the accompanying drawings.

However, the technical idea of the present invention is not limited to some embodiments set forth herein and may be embodied in many different forms, and one or more of components of these embodiments may be selectively combined or substituted within the scope of the present invention.

All terms (including technical and scientific terms) used in embodiments of the present invention have the same meaning as commonly understood by those of ordinary skill in the art to which the present invention pertains, unless otherwise defined. Terms, such as those defined in commonly-used dictionaries, should be interpreted as having a meaning in the context of the relevant art.

In addition, the terms used in embodiments of the present invention are for the purpose of describing embodiments only and are not intended to be limiting of the present invention.

As used herein, singular forms are intended to include plural forms as well, unless the context clearly indicate otherwise. Expressions such as "at least one (or one or more) of A, B and C" should be understood to include one or more of all possible combinations of A, B, and C.

In addition, terms such as first, second, A, B, (a), and (b) may be used to describe components of embodiments of the present invention.

These terms are only for distinguishing a component from other components and thus the nature, sequence, order, etc. of the components are not limited by these terms.

When one component is referred to as being "coupled to," "combined with," or "connected to" another component, it should be understood that the component is directly coupled to, combined with or connected to the other component or is coupled to, combined with or connected to the other component via another component therebetween.

When one component is referred to as being formed or disposed "on (above) or below (under)" another component, it should be understood that the two components are in direct contact with each other or one or more components are formed or disposed between the two components. In addition, it should be understood that the terms "on (above) or below (under)" encompass not only an upward direction but also a downward direction with respect to one component.

Hereinafter, embodiments will be described in detail with reference to the accompanying drawings, and the same or corresponding components will be assigned the same reference numerals even in different drawings and a description thereof will not be redundantly described herein.

Figure 2:
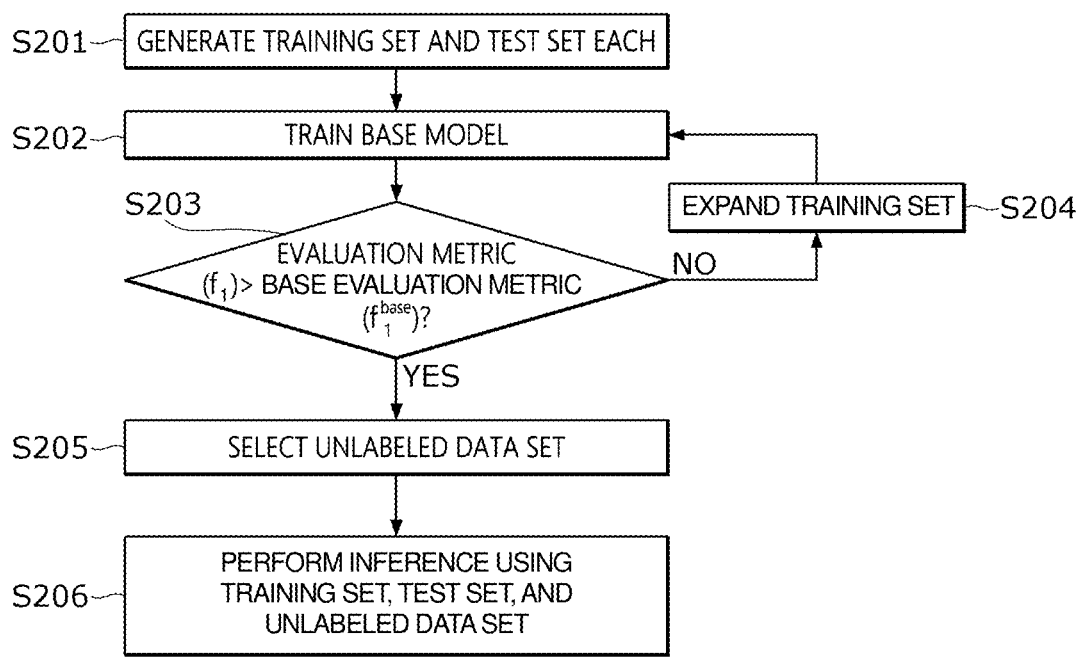
FIG. 2 is a flow diagram for explaining an operation of a label inference system according to an embodiment.

FIG. 1 is a configuration block diagram of a label inference system 10 according to an embodiment. FIG. 2 is a flow diagram for explaining an operation of the label inference system 10 according to an embodiment.

Referring to FIGS. 1 and 2, the label inference system 10 according to an embodiment may include a data generator 11, a data trainer 12, a determiner 13, and a data inference unit 14.

The label inference system 10 according to an embodiment may perform generating a training set and a test set, each including a plurality of images labeled with experts' annotations (S201), performing training for a base model based on the training set and the test set (S202), determining whether an evaluation metric $f_1$ of the base model satisfies a base evaluation metric $f_1^{base}$ (S203); if No, expanding the training set by labeling and adding another batch of data into the training set when the evaluation metric $f_1$ of the base model is less than or equal to the base evaluation metric $f_1^{base}$ (S204); performing training for the base model based on expanded training set and the test set (S202); if Yes, selecting an unlabeled data set when the evaluation metric $f_1$ of the base model is greater than the base evaluation metric $f_1^{base}$ (S205); and performing inference using the training set, the test set, and the unlabeled data set (S206).

The label inference system 10 according to an embodiment may comprise two-phase data construction flow which consists of a initial phase for constructing a reasonably modest model and a iterative phase involving incremental human-annotation in which an online update operation plays an important role in minimizing necessary external intervention.

First, the data generator 11 may generate a training set and a test set, each including a plurality of images labeled with experts' annotations. Each of the training set and the test set may include a formally defined number of images, i.e., batch data, together with medical experts' annotations. The training set and the test set may be used to train and evaluate a base model $\theta_{base}$.

In an embodiment, a data set including annotations may be obtained by weakly supervised labels and unsupervised methods to gradually improve data quality.

In an embodiment, VBCheX, which is a completely new annotated data set of chest X-ray images collected from hospitals for research purposes, may be used as the training set and the test set. VBCheX may refer to a data set including the largest number of manual annotations for seventeen pathologies and labels for tuberculosis which is an infectious disease.

The data trainer 12 may perform training for the base model based on expanded training set and the test set.

The determiner 13 may determine whether the evaluation metric $f_1$ of the base model satisfies the base evaluation metric $f_1^{base}$. The data generator 11 may expand the training set by labeling and adding another batch of data into the training set when the determiner 13 determines the evaluation metric $f_1$ of the base model is less than or equal to the base evaluation metric $f_1^{base}$. The data trainer 12 may repeatedly perform for the base model based on expanded training set and the test set.

After repeated training of the base model, the determiner 13 may compare the evaluation metric $f_1$ of the base model and the base evaluation metric $f_1^{base}$ with each other. The data inference unit 14 may select an unlabeled data set when the evaluation metric $f_1$ of the base model satisfies the base evaluation metric $f_1^{base}$, i.e., when the evaluation metric $f_1$ of the base model is greater than the base evaluation metric $f_1^{base}$. In this case, the initial phase described above ends.

At an end point of the initial phase, the training set includes $n_{init}$ batches of data and the test set may include one batch of data.

Next, the data inference unit 14 may perform inference using the training set, the test set, and the unlabeled data set. The data inference unit 14 may use a reasonably modest base model and then select an unlabeled data set and combination of the training set containing the $n_{init}$ batches of data and the test set including one batch of data for performing inference.

The data inference unit 14 may calculate a current inference value of the unlabeled data set from a weighted average value of a previous inference value and a current estimated value. In the case of the unlabeled data set, a current inference value $\hat{p}_t$ is weighted averaging with a previous inference value $\hat{p}_{t-1}$ and a current estimated value $P_t$ at a specific iteration t. For example, the data inference unit 14 may calculate the current inference value $\hat{p}_t$ of the unlabeled data set according to Equation 1 below.

$$\hat{p}_t = F_\mu(\hat{p}_{t-1}, P_t),\qquad\text{[Equation 1]}$$

In Equation 1 above, $F_\mu$ represents an online update operator with momentum $\mu$.

As a result of the inference, the inference value $\hat{p}_t$ may potentially include samples with high confidence scores $\hat{p}_t^H$ and low confidence scores $\hat{p}_t^L$.

The data inference unit 14 may extract samples with thresholded high confidence scores $\hat{p}_t^{H,thresh}$ by hard-thresholding the subset of the samples with the high confidence scores $\hat{p}_t^H$ using a threshold $\tau_t$. In addition, the data inference unit 14 may extract samples with relabeled low confidence scores $\hat{p}_t^{L,relabel}$, which is a subset of the samples with low confidence scores relabeled by an user, and extract outliers of the training set and the test set, which need to be relabeled by an user, using the threshold $\tau_t$.

The subset of the samples with the high confident scores $\hat{p}p$ is hard-thresholded by the threshold $\tau_t$ to produce the samples with thresholded high confidence scores $\hat{p}_t^{H,thresh}$ and is combined with samples with relabeled low confidence scores $\hat{p}_t^{L,relabel}$, which are annotation relabeled by an user with respect to the low confidence scores. A current training set and test set that are re-evaluated are also based on the threshold $\tau_t$ for extracting outliers which need to be labeled by an user.

Next, the data inference unit 14 may perform inference using the updated training set and test set, which are modified by relabeling, and the updated unlabeled data set. After relabeling performed by an user, the data inference unit 14 trains a new snapshot of a model $\theta_t$ for some iterations t using a triplet (the updated unlabeled data set, the training set, and the test set) of the modified data set. When an evaluation metric is satisfied (e.g., the evaluation metric $f_1$ is greater than the target evaluation metric $f_1^{target}$, $f_1 > f_1^{target}$), a terminal condition is triggered.

In an embodiment, the user is preferably a doctor.

Therefore, in a next online active learning iteration, the training set may be self-corrected by relabeling of outliers associated therewith, and expanded by an amount of new labeling with respect to the relabeled low confidence score $\hat{p}_t^{L,relabel}$ of the unlabeled data set.

Using the label inference system 10 according to the embodiment, the number of additionally labeled samples for unlabeled data and the number of times of relabeling for the training set and the test set can be minimized in the long term, in terms of costs.

In a binary classification task, the data inference unit 14 may decide whether an image includes a predefined label according to Equation 2 below by using the distance from a decision boundary parameterized by a trained weight vector and feature vector, which are extracted from the image via a deep CNN.

$$P(C=1|x)=\sigma(\omega^T f(x,\theta))$$

$$P(C=0|x)=1-P(C=1|x) \quad \text{[Equation 2]}$$

For example, in Equation 2, P(C=1|x) may represent the probability that the image includes the predefined label and P(C=0|x) may represent the probability that the image does not include the predefined label. Conversely, in Equation 2, P(C=1|x) may represent the probability that the image does not include the predefined label and P(C=0 |x) may represent the probability that the image includes the predefined label. In addition, in Equation 2, f (x, θ) represents a feature extracted from the CNN, ω represents a trained weight vector, and σ represents a sigmoid function. A general approach to active learning includes calculating an uncertainty score uncertain(x) using entropy according to Equation 3 below, assigning a label to instances with a low uncertainty score, and randomly selecting instances for further annotation.

$$\text{uncertain}(x) = \sum_{c=0,1} -p(c\mid x)\text{Log}(p(c\mid x)) \quad \text{[Equation 3]}$$

This approach is equivalent to selecting an instance with a high confidence score p(c=1|x) or p(c=0|x) to assign a label and picking in-between instances for annotation.

However, only little information is obtained through data instances close to a high confidence threshold and thus a small amount of information is obtained through this approach. In particular, instances with high confidence scores have very discriminative feature vectors, which exist far above/below a decision boundary f(x, θ) (i.e., $\omega^T f(x,\theta)$ >>0, ($\omega^T f(x,\theta)$)<<0 in the case of a negative instance with a high confidence score)).

Such instances are not as informative as instances of which a feature vector is present at a decision boundary (i.e., $\omega^T f(x,\theta) \approx 0$), which contain non-discriminative features for which a classifier cannot assign a label 1 or 0 and thus contain most additional information for further learning.

Figure 3:
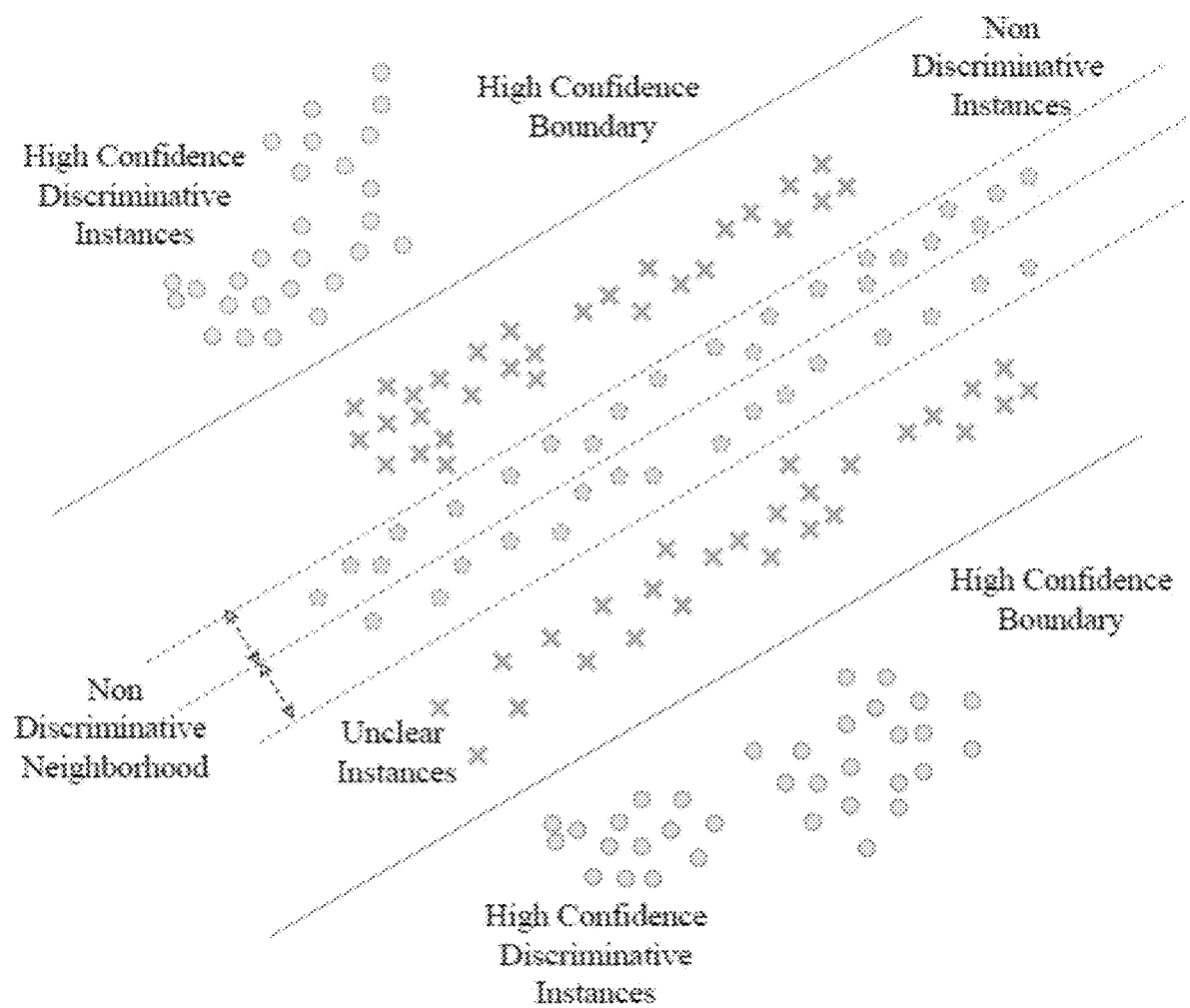
FIG. 3 is a diagram illustrating a distribution of samples with respect to a decision boundary.

FIG. 3 is a diagram illustrating a distribution of samples with respect to a decision boundary. Referring to FIG. 3, a high-confidence sample group (high-confidence discriminative instances) already contains discriminatory features and thus is non-informative, whereas features of a sample group near the decision boundary contain unknown information and thus are more informative. In conclusion, as illustrated in FIG. 3, when instances are selected near the decision boundary, best performance can be obtained, compared to when instances are randomly selected.

In the case of human annotators, mistakes may occur when working with thousands of instances. Such mistakes may cause noise in learning, thus making it difficult to converge learning. In order to reduce human error, the data inference unit 14 may detect all possible noisy labeled instances in a training set and provide these instances to an annotator for label re-evaluation.

For example, the success of training a supervised deep learning model may contribute to the collection of a large-scale data set annotated by human annotators. However, a human annotation process, especially for medical imaging applications, generates a large amount of noisy labels due to human observation errors or computer-generated label errors. Many studies have shown that noisy labels may negatively affect the performance of a model. In recent years, much attention has been paid to handling noisy labels. A noise label processing method is proposed herein with various strategies that may be classified into three main strategies: a database-based method, a network architecture-based method, and a training procedure-based method.

In the database-based method, inaccurate data samples are identified and corrected or discarded during a training process. Noisy data is predicted as soft labels for final training by using an ensemble training classifier. CleanNet identifies correct or incorrect labels by estimating a similarity between feature vectors of data samples. In addition, smoothing labels are advantageously applied to model distillation of noisy data. These methods based on data cleansing and pre-processing appear to be effective ways for training models with high-level noisy data sets.

As the network architecture-based method, for the purpose of training a transition matrix between noise and an actual label, the development of network architectures for training with noise has been applied in several approaches using an additional noise layer or a Generative Adversarial Network (GAN).

Recently, training procedure-based methods for dealing with noise labels has been applied in various ways. In the co-teaching method, proposed in "Co-teaching: Robust Training of Deep Neural Networks with Extremely Noisy Labels" by X.Y., G.N., M.X., W.H., I.T., M.S., Bo Han, Quanming Yao, NeurIPS, 2018, two networks are trained in parallel by using samples have small losses to train each other. In "Mixup: Beyond Empirical Risk Minimization," proposed by Y. N. D., D. L-P., Hongyi Zhang, Moustapha Cisse, ICLR, 2018, label noise is processed by training models with training data samples and labels newly generated by combination of pairs of training data sets and their labels. In addition, a combination of the Co-teaching method and the Mixup method is an effective method to reduce classification errors with label noise data shown by Berthelot et al. Data re-weighting is a simple way to handle label noise during a training process. The optimization weights are assigned to minimize loss for likely clear samples are much higher than noise samples. This method may be effective for data with a limited amount of clear samples. Data label consistency, which is another effective strategy, may be applied to update a teacher model trained with noise label data, a student model trained with clean data, and predicted labels from the teacher model.

In addition to selecting instances for additional labeling, the data inference unit 14 may employ a data distillation approach to generate pseudo-labels for high confidence data (p≥0.9 or p≤0.1). However, such label generated data may be inherently noisy because the model may not be strong enough to generate a consistent label at the start of active learning iteration. That is, high confidence instances in one iteration may become low confidence instances in a next iteration.

The data inference unit 14 may calculate a current inference value of the unlabeled data set using momentum. For example, the data inference unit 14 may apply an approach of stabilizing a confidence output of a model using momentum according to Equation 4 below.

$$\hat{p}_t = F_\mu(\hat{p}_{t-1}, P_t) = \mu\hat{p}_{t-1} + (1-\mu)P_t \quad \text{[Equation 4]}$$

In Equation 4, $\hat{p}_t$ represents a final confidence score, $P_t$ represents a distilled confidence score of a model in an iteration t and μ represents a momentum parameter for controlling an effect of previous scores on the final confidence score.

Figure 4:
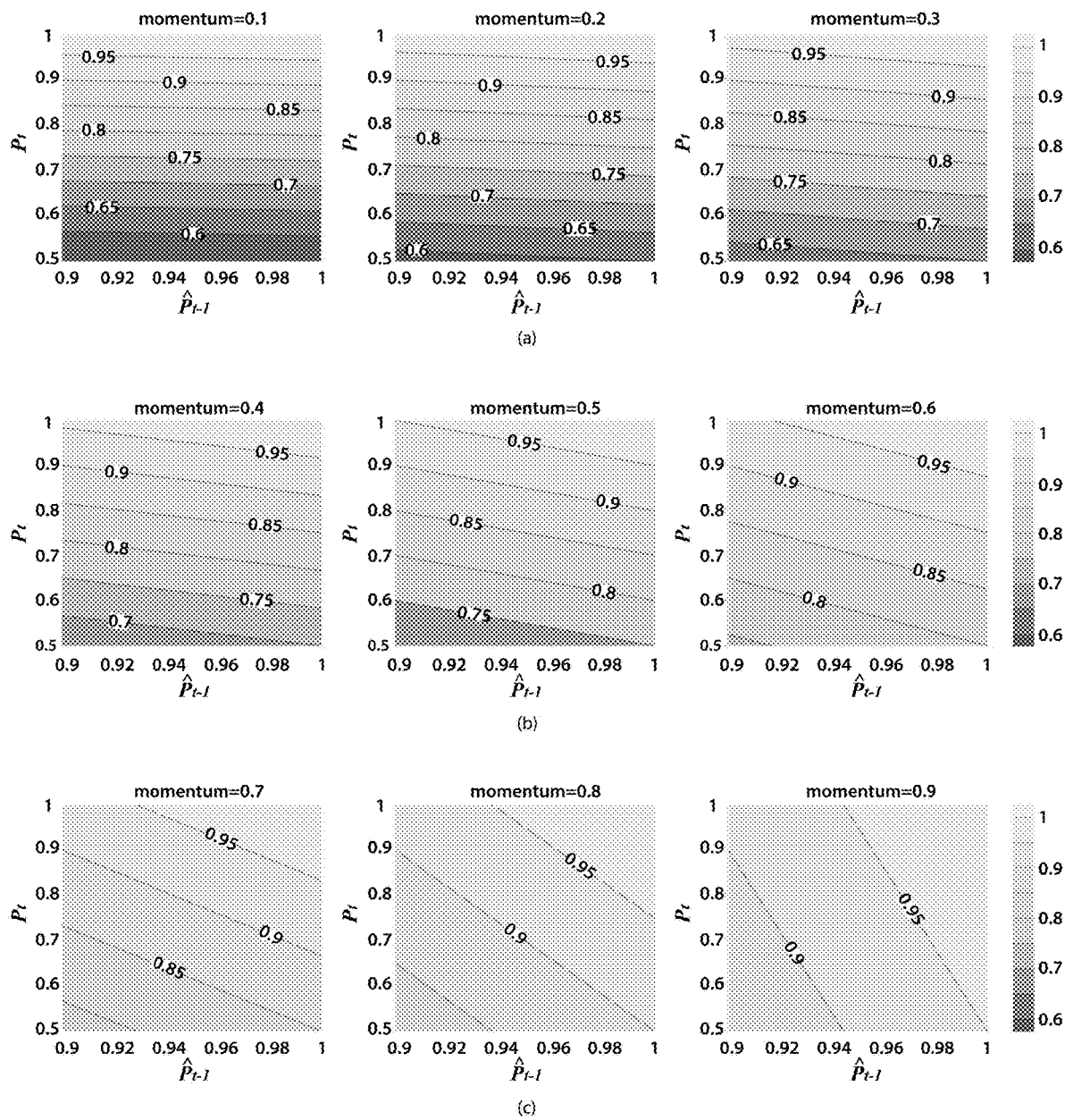
FIG. 4 illustrates contour plots of final confidence scores according to different momentum values.

FIG. 4 illustrates contour plots of final confidence scores according to different momentum values. As illustrated in FIG. 4, as μ varies from 0.1 to 0.4, an instance $\hat{p}_{t-1}$ has little effect on a final outcome which limits a good-instance pool (i.e., an instance with $P_t \approx 0.8$ but $\hat{p}_{t-1} \ge 0.9$). In contrast, when μ varies from 0.6 to 0.9, instances with a low confidence score (pt≈0.6) have a high final confidence score and thus unstable instances remain in the training set, thereby causing the training process to become more unstable. Therefore, 0.5 is selected as μ to balance a result of current and previous confidence scores. When μ is 0.5, high confidence instances of iteration t−1 are allowed to fluctuate down to 0.8 at the current iteration while maintained at a final high confidence score ($\hat{p}_t \ge 0.9$), thereby making a training loop more stable.

FIGS. 5 to 8 are diagrams for explaining results of experiments conducted through the label inference system 10 according to an embodiment. For all experiments of FIGS. 5 to 8, a ResNext50-32×4d architecture pre-trained on Imagenet was used. For optimization, SGD with a Nesterov momentum value of 0.9 and a weight of $10^{-6}$ was used. For each active-learning iteration, the method introduced by L. N. Smith ("Cyclical learning rates for training neural networks," 2017 IEEE Winter Conference on Applications of Computer Vision, WACV 2017, Santa Rosa, CA, USA, Mar. 24-31, 2017. IEEE ComputerSociety, 2017, pp. 464-472) is used to find a suitable learning rate. Then a model was trained for 8 epochs by applying super convergence introduced by L. N. Smith and N. Topin ("Super-convergence: Very fast training of residual networks using large learning rates," CoRR, vol. abs/1708.07120, 2017). For data preprocessing, first, a chest X-ray image was resized to the shortest size of 320 while maintaining sizes of other images at the same aspect ratio. For data augmentation, a 320×320 patch was randomly cropped from the image, and brightness/contrast control and geometric transformations, such as horizontal and symmetric translation, up/down-scaling, transformation, and rotation, were randomly performed. Progressive training was performed from a low resolution to a high resolution to obtain a better final result with respect to a test set. In addition, horizontal flipping, zooming, and cropping provide the best estimation of a distillation confident score for each active-learning iteration.

In the experiments, a dataset VBCheX was tested with respect to two pathologies, i.e., lung lesion pathology and cardiomegaly pathology. A standard baseline is constructed for a normal industrial process i.e random instances from labeled dataset are added in a batch of 10,000 instances. For active learning, an experiment was conducted on a naive sampling approach that selects a batch of 10,000 instances with a confidence score between a negative high confidence threshold and a positive high confidence threshold (i.e., $0.1 < \hat{p}_t < 0.9$). In the proposed method, the same high confidence threshold as the naive approach was used but in the case of labeling an instance, all data points with a confidence score $\hat{p}_t$ between 0.4 and 0.6 were selected.

Therefore, it can be seen that the number of instances with a confidence score near a decision boundary is quite reasonable, compared to selecting 10,000 batch data for further labeling. In addition, data instances near the decision boundary are more informative when compared to the naive sampling approach, and the present invention is directed to providing the best performance improvement in a test set. Additionally, using momentum may further stabilize a process of adding pseudo-labeled data instances to a training set, thereby improving a F1 score in the test set.

FIG. 5 illustrates the performance of various methods of processing unlabeled high confidence data. Referring to FIG. 5, it can be seen that in an example in which a distillation method was applied (pseudo label with distillation), indexes Recall, AUC, F1 and F2 were highest.

FIG. 6 illustrates results of active-learning lung lesions. Referring to FIG. 6, it can be seen that an index F1 appeared highest in an example in which boundary samples and momentum were applied.

Figure 7:
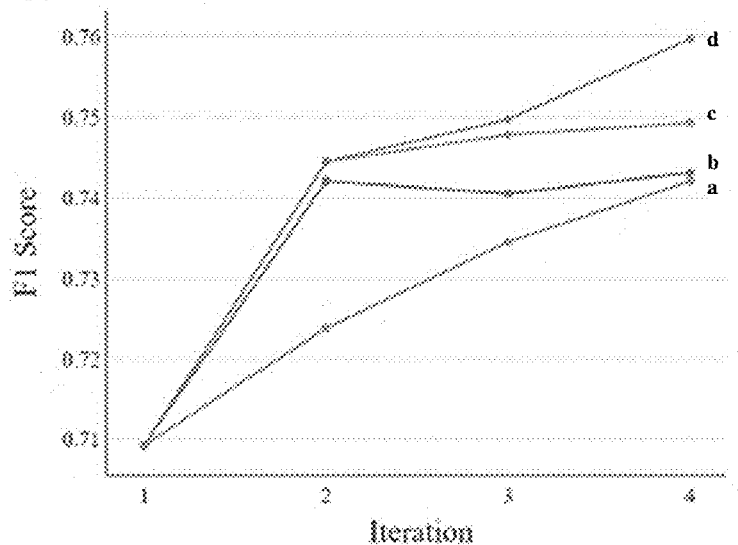
Figure 7:
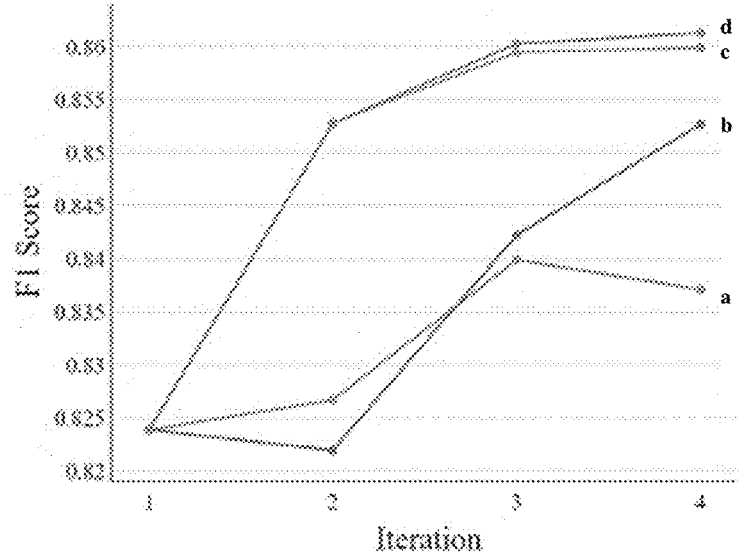

FIG. 7 is a diagram for explaining results of experiments conducted through a label inference system according to an embodiment. The upper graph shows results of repeatedly active-learning lung lesion pathology using a data set VBCheX. The lower graph shows results of repeatedly active-learning cardiomegaly pathology using the data set VBCheX. Referring to FIG. 7, it can be seen from the results of repeatedly active-learning lung lesion pathology and cardiomegaly pathology that an index F1 was highest in examples in which boundary samples and momentum were applied.

Figure 8:
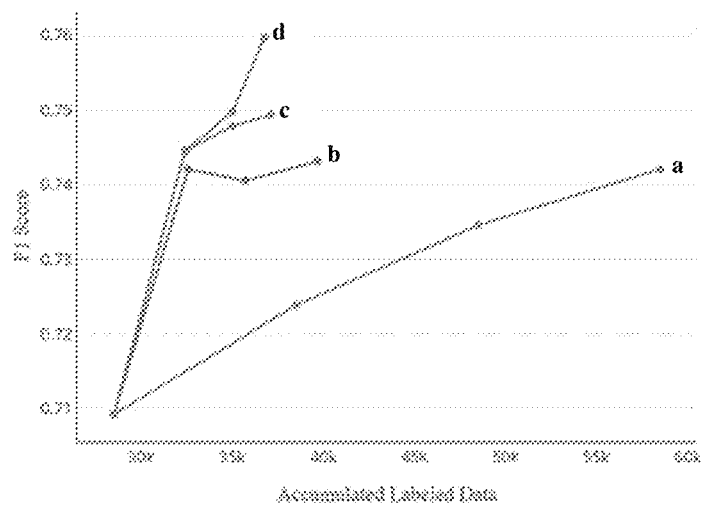

FIG. 8 is a graph showing cumulative results of active-learning lung lesion pathology using a dataset VBCheX. Referring to FIG. 8, it can be seen from the cumulative results of active-learning lung lesion pathology and cardiomegaly pathology that an index F1 was highest in examples in which boundary samples and momentum were applied.

The term 'unit' as used herein refers to software or a hardware component, such as a field-programmable gate array (FPGA) or an application-specific integrated circuit (ASIC), which performs certain functions. However, the term 'unit' is not limited to software or hardware. The term 'unit' may be configured to be stored in an addressable storage medium or to reproduce one or more processors. Thus, the term 'unit' may include, for example, components, such as software components, object-oriented software components, class components, and task components, processes, functions, attributes, procedures, subroutines, segments of program code, drivers, firmware, microcode, a circuit, data, database, data structures, tables, arrays, and parameters. Components and functions provided in 'units' may be combined into a smaller number of components and "units" or may be divided into sub-components and 'sub-units'. In addition, the components and 'units' may be implemented to execute one or more CPUs in a device or a secure multimedia card.

While embodiments of the present invention have been described above, it will be apparent to those of ordinary skill in the art that various modifications and changes may be made therein without departing from the spirit and scope of the present invention described in the following claims.

What is claimed is:

1. A label inference system comprising:
    a data generator configured to generate a training set and a test set, each including a plurality of images labeled with experts' annotations;
    a data trainer configured to perform training for a base model based on the generated training set and test set;
    a determiner configured to identify whether an evaluation metric $f_1$ of the training model satisfies a base evaluation metric $f_1^{base}$; and
    a data inference unit configured to perform inference using the training set, the test set, and an unlabeled data set with the training model satisfying the base evaluation metric $f_1^{base}$, wherein the data inference unit calculates a current inference value of the unlabeled data set from a weighted average value of a previous inference value and a current estimated value according to the following Equation 1:

$$\hat{p}_t = F_\mu(\hat{p}_{t-1}, P_t), \quad 1$$

wherein $\hat{p}_t$ represents the current inference value, $\hat{p}_{t-1}$ represents a previous inference value, $p_t$ represents a current estimated value, $F_\mu$ represents an online update operator with momentum $\mu$, and t is a natural number.

2. The label inference system of claim 1, wherein the data generator expands the training set by labeling and adding another batch of data into the training set when the determiner identifies that the evaluation metric $f_1$ of the training model is less than or equal to the base evaluation metric $f_1^{base}$.

3. The label inference system of claim 2, wherein the data trainer performs for the base model based on expanded training set and the test set.

4. The label inference system of claim 1, wherein, when the determiner identifies that the evaluation metric $f_1$ of the training model is greater than the base evaluation metric $f_1^{base}$, the data inference unit selects an unlabeled data set from a data pool.

5. The label inference system of claim 1, wherein the current inference values $\hat{p}_t$ comprise samples with high confident score $\hat{p}_t^H$ and samples with low confident score $\hat{p}_t^L$.

6. The label inference system of claim 5, wherein the data inference unit extracts samples with thresholded high confidence scores $\hat{p}_t^{H,thresh}$ by hard-thresholding a subset of the samples with the high confidence scores $\hat{p}_t^H$ using a threshold $\tau_t$.

7. The label inference system of claim 6, wherein the data inference unit extracts samples with relabeled low confidence score $\hat{p}_t^{L,relabel}$, which is a subset of the samples with low confidence scores relabeled by an user.

8. The label inference system of claim 7, wherein the data inference unit extracts outliers of the training set and the test set, which need to be relabeled by a user, using the threshold $\tau_t$.

9. The label inference system of claim 8, wherein the data inference unit performs inference using the updated training set and test set, which are modified by relabeling, and the updated unlabeled data set.

10. The label inference system of claim 9, wherein the data inference unit trains a new snapshot of the training model for some iterations t using the updated unlabeled data set, training set, and test set.

11. The label inference system of claim 10, wherein, when the determiner identifies that the evaluation metric $f_1$ of the training model is greater than the target evaluation metric $f_1^{target}$, a terminal condition of the data inference unit is triggered.

12. The label inference system of claim 1, wherein the data inference unit calculates the current inference value of the unlabeled data set using momentum.

13. The label inference system of claim 1, wherein the momentum is set to 0.5.

* * * * *